Nov. 9, 1965
B. WALKER
3,217,177
LOGIC CIRCUITS
Filed June 11, 1962
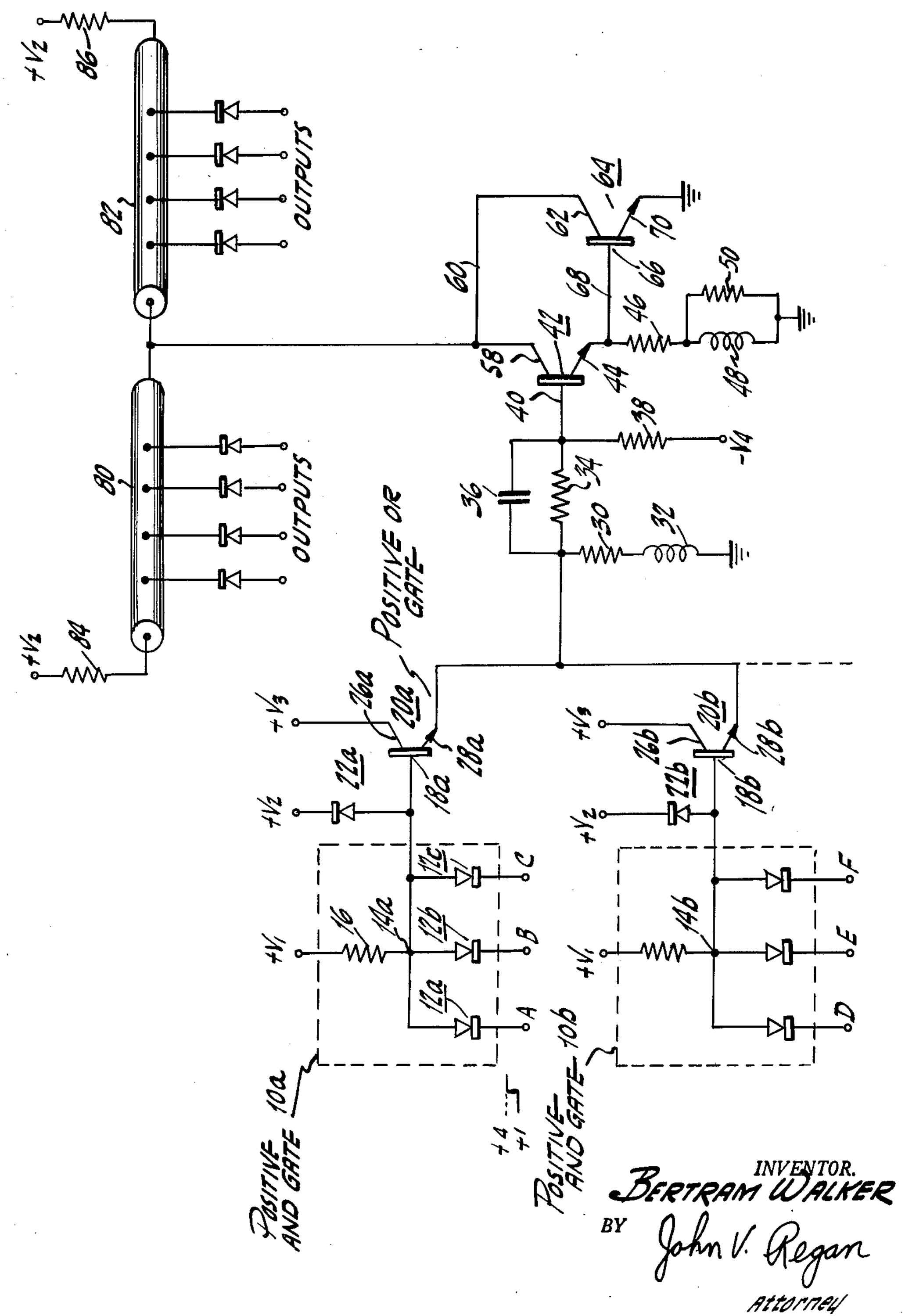
INVENTOR.
BERTRAM WALKER
BY John V. Regan
Attorney United States Patent Office 3,217,177
Patented Nov. 9, 1965

3,217,177
LOGIC CIRCUITS

Bertram Walker, Levittown, Pa., assignor to Radio Corporation of America, a corporation of Delaware
Filed June 11, 1962, Ser. No. 201,533
6 Claims. (Cl. 307—88.5)

This invention relates to logic circuits and, in particular, to a high speed logic circuit having low input current requirements and producing a high output current.

This circuit is a two-level logic circuit which is particularly well-suited for use in high speed digital computers where interconnections between the various circuits are made by way of transmission lines, although it is to be understood that the circuit is not limited in use to such an application. One of the problems often encountered in driving logic circuits from transmission lines is that heavy loading on the transmission lines may cause undesirably large reflections therein which may result in spurious signals. It is desirable therefore that the logic circuits be ones which have low input current requirements.

Emitter followers have high input impedances and low drive current requirements. They also are capable of very high speed operation since they are rarely driven into saturation. Nevertheless, such circuits generally have not found favor in logic circuit arrangements because of their tendency to oscillate if the output capacitance is large, as it is when driving remote loads, and also when the loading thereon varies.

Accordingly, it is one object of this invention to provide an improved high speed logic circuit which has low input current requirements and a high output current.

It is another object of this invention to provide a high speed logic circuit which employs emitter followers, yet which is not prone to oscillate.

It is another object of this invention to provide a two-level logic circuit which employs diode positive AND gates (negative OR gates) driving an emitter follower posiitve OR gate (negative AND gate).

It is still another object of this invention to provide an improved logic circuit which may be driven at high speed from transmission lines, and which may drive other transmission lines without undesirably large transmission line reflections.

These and other objects are accomplished according to the invention by connecting one or more emitter followers with the emitters tied together. A common load resistor is connected between a point of reference potential and each emitter electrode. A separate diode gate is provided for driving each emitter follower. These gates are biased to draw low current so as not to load down the gate signal sources. Accordingly, these gates may be driven by way of transmission lines without causing large reflections. An output transistor, connected in the common emitter configuration, receives the common output of the emitter followers and supplies current to one or more output loads. The output transistor isolates the loads from the emitter follower, provides current gain for driving many loads, and reshapes the output signal.

In the accompanying drawing, the sole figure is a schematic diagram of a high speed logic circuit according to the invention.

High speed logic circuits in digital computers generally must be interconnected by way of transmission lines such as coaxial cable, twisted pair lines, microstrip transmission lines, or the like in order to provide the necessary shielding to prevent crosstalk. The driven loads which are supplied from the transmission lines should be ones which have low power requirements in order to prevent heavy loading of, and undesirably large reflections in, the transmission line. Large reflections in the transmission line may result in slower rise and fall times of the signals, and, even worse, in spurious signals and false triggering of the logic circuits.

It is known to perform two-level logic using diode gates driving diode gates, which in turn, feed into transistor inverters for power gain. To drive the transistor inverter at high speed, the second diode gate need switch a relatively high current. This, then, requires that the first diode gate draw an amount of current which is undesirably large when this input gate is driven from a transmission line.

An emitter follower, on the other hand, has a high input impedance, requires only a small base drive, switches rapidly, and gives current gain. Consequently, the diode gate which drives the emitter follower may be arranged to draw only a small amount of current as compared to the case where the diode gate drives another diode gate in two-level logic. The use of emitter followers in computer logic circuits has generally been avoided because of the relative instability of emitter followers as compared to common emitter transistor circuits. This instability is due to several factors among which are the output capacitance, low output impedance, feedback and high gain-bandwidth. The problem of oscillations is especially critical when the output load driven by the emitter follower is variable, as is the case where several other logic circuits are driven directly from the output of the emitter follower. Moreover, in the latter case, the current for the output loads must be supplied through the collector-emitter path of the emitter follower, or emitter follpwers, and the transistor power dissipation may exceed desirable limits.

As is known, an emitter follower has a higher operating speed than a transistor connected in the common emitter configuration because the emitter follower is designed not to be driven into saturation. The present invention takes advantage of the high speed capabilities and high input impedance of the emitter follower circuit. The tendency of the emitter follower circuit to oscillate is prevented according to the invention by so locating the emitter follower in the logic circuit that it is always presented with known fixed loads which are so tailored that no oscillations occur. The output of the emitted follower is supplied to a high gain transistor circuit which includes at least one transistor connected in the common emitter configuration. The output loads are connected to the output of the latter transistor or transistors. This transistor or transistors not only isolates the loads from the emitter follower, for practical purposes, but also reshapes the output signal to prevent fall-off in signal amplitude due to level shifting, thereby allowing many logic circuits to be cascaded in a long string. Reshaping of the output signal becomes necessary in a cascaded chain because neither diode gates nor emitter followers have voltage gain.

In the drawing, first and second positive AND gates **10*a* and 10*b* are illustrated. The positive AND gate 10*a* includes a number of diodes 12*a* . . . 12*c*, three of which are shown by way of illustration, having their anodes connected together at a common junction point 14*a*. Separate input signals A, B and C are supplied respectively to the cathodes of the diodes 12*a*, 12*b* and 12*c*. These input signals may be supplied by transmission lines (not shown). A resistor 16 is connected between the common junction 14 and a source of bias potential $+V_1$, which may be a battery (not shown) having its positive terminal connected to the upper end of the resistor 16** and having its negative terminal connected to a point of reference potential, such as circuit ground.

The output of the AND gate **10*a* is applied to the base electrode 18*a* of an NPN transistor 20*a* which is connected to operate as an emitter follower. A diode 22***a* is connected between the base electrode 18*a* and a point of positive potential $+V_2$ and is poled to clamp the maximum positive voltage at the base electrode 18*a* at a value of approximately $V_2$ volts. The diodes 12*a* . . . 12*c* are poled to conduct forward current in the same direction, relative to the common junction 14*a*, as the direction of forward base-emitter diode current of the transistor 20*a*.

The inputs A, B and C may be either +1 or +4 volts, by way of illustration. Assuming negligible forward voltage drop across the diodes 12*a* . . . 12*c*, it is desired that the voltage at the common junction 14*a* have a value of +1 volt when one or more of the inputs A, B and C is +1 volt and have a value of +4 volts when all of the inputs A, B and C are +4 volts. The values of the bias source $+V_1$ and the resistor 16 are selected so that sufficient current is supplied by the resistor 16 to drive base 18*a* of the emitter-follower and the stray device and wiring capacity accumulated at the junction of the diodes, resistor and transistor so that the circuit operates at the desired speed.

In the case of a diode used as the second level of logic, it must switch a large current in order to switch the transistor power inverter rapidly, and the resistor 16 must be correspondingly small in value to supply this current. A resistor of low value, however, results in heavy diode 12*a* . . . 12*c* current. In the case of an emitter follower used as the second level of logic, the resistor 16 may be large in value by comparison because of the current gain of the emitter follower. Thus, the value of the resistor 16 in the present circuit may be made large enough to limit the current through the diodes 12*a* . . . 12*c* to a small enough value to prevent heavy loading on the transmission lines which supply the inputs A, B and C.

The collector 26*a* of the transistor 20*a* is connected directly to a source of positive bias potential $+V_3$. The emitter electrode 28*a* is connected to circuit ground by way of the series combination of a resistor 30 and an inductor 32. The inductor 32 is not essential but may be added, as desired, for purposes which will be described hereinafter.

The output of the second positive AND gate 10*b* is applied to the base electrode 18*b* of a second NPN transistor 20*b*. The collector 26*b* is directly connected to the bias source $+V_3$, and the emitter electrode 28*b* is connected to the emitter electrode 28*a* of the transistor 20*a* and to the upper terminal of the common emitter resistor 30, whereby the transistors 20*a* and 20*b* are connected as a positive OR gate. Other emitter follower transistors of like conductivity type and associated positive AND gates may be connected in the manner aforementioned, depending upon the number of AND and OR gates required, as indicated by the dashed line projecting downward from the emitter electrode 28*b*. The emitter followers perform the positive OR logic function when the diode gates perform the positive AND function.

The common output of the emitter followers is applied to the base electrode 40 of a first output transistor 42 by way of the parallel combination of a resistor 34 and a capacitor 36. A resistor 38 is connected between the base electrode 40 and a source of bias potential $-V_4$. The value of resistors 34 and 38 and bias source $-V_4$ are selected so that the transistor 42 is biased in the nonconducting or "off" condition when all of the emitter follower transistors 20*a*, 20*b* are in the "off" or low conducting condition. The emitter electrode 44 of the transistor 42 is connected to ground through the series combination of a resistor 46 and an inductor 48. The inductor 48 is paralleled by a resistor 50 which is provided for damping of ringing caused by the inductor 48. The collector electrode 58 is connected by way of a lead 60 to the collector electrode 62 of a second output transistor 64. The base electrode 66 of the latter transistor 64 is connected to the emitter 44 of transistor 42 by a lead 68, and the emitter electrode 70 is grounded.

Connecting the two output transistors 42 and 64 in the manner illustrated has the effect, among others, of greatly increasing the beta of the combination to a value which is much greater than the sum of the betas, it being equal approximately to the product of the betas of the transistors 42 and 64. The transistor 64 does not saturate because of the particular connections to its base 66 and collector 62 electrodes. This arrangement, because of its high current-handling capacity, is especially well suited for driving remote loads through long, high capacitance, open signal means or through low impedance, terminated transmission lines. The arrangement also is capable of driving output loads more rapidly than is possible with a single transistor of the same type.

The collector electrodes 58 and 62 are connected to the inputs of two transmission lines 80 and 82 which may be, for example, coaxial lines. The transmission line 80 is terminated by a resistor 84 connected to a source of bias potential $+V_2$ volts. The transmission line 82 is similarly terminated by a resistor 86. A number of output loads may be tapped to the transmission lines between the ends thereof. These loads may be diodes of diode gates such as the gates 10*a* and 10*b* described previously. The values of the resistors 84 and 86 are selected so that the transmission lines 80 and 82 are terminated in their characteristic impedance. The bias source $+V_2$ volts is the sole source of bias for the collector electrodes 58 and 62.

As is well known, a diode gate which performs the positive AND logic function also performs the negative OR logic function. Also, an emitter follower arrangement, of the type described, performs the positive OR logic function and the negative AND logic function. Accordingly, the output loads driven by the transmission lines 80 and 82 may be diode gates which perform the negative OR function when the gates 10*a* and 10*b* are performing the positive AND function.

Consider the operation of the circuit and assume first that one or more of the inputs A, B and C and one or more of the inputs D, E and F is at +1 volt, representing a binary "0." The voltages at the common junctions 14*a* and 14*b* then are approximately +1 volt. The base-emitter diodes of the emitter follower transistors 20*a* and 20*b* are forward biased, and the output of the emitter follower OR gate, that is the voltage between the emitters 28*a*, 28*b* and ground, is less positive than +1 volt. Output transistor 42 is held cut-off under this condition by the negative bias supplied by the $-V_4$ volt source, resistor 38, and level shift resistor 34. The voltage at the collectors 58 and 62 of the output transistors 42 and 64 then is approximately +4 volts, which is the voltage of $V_2$ in this case, and a voltage of +4 volts is supplied to all of the loads connected to the transmission lines 80 and 82.

Assume now that all of the inputs A, B and C to the diode gate 10*a* are at +4 volts. The voltage at the common junction 14*a* then is approximately +4 volts, assuming negligible drop across the diodes 12*a* . . . 12*c*. This voltage biases the transistor 20*a* into greater conduction and the voltage at the output of the emitter follower gate rises toward +4 volts. This voltage is sufficient to overcome the bias on the output transistor 42 and saturate the transistor 42. The inductor 48 in the emitter circuit of the transistor 42 presents a high impedance to current flow when the transistor 42 first turns "on," whereby the emitter 44 current is supplied to the base 66 of the second output transistor 64, turning the latter transistor "on" with minimum delay. The voltage at the collectors 58 and 62 falls to approximately +1 volt when the transistors 42 and 64 reach a steady state condition. The voltage then supplied to the loads from the transmission line 80 and 82 is approximately +1 volt.

The same operation aforementioned results when all of the inputs D, E and F to the second diode gate **10*b* rise from +1 volt to +4 volts. The inputs fall to +1 volt when the input signals terminate. The transistor 20*a* or 20*b* current, as the case may be, then falls to its low value and the output voltage of the emitter follower falls below 1 volt, cutting off the first output transistor 42. The inductor 48 presents a high impedance to any change in current and thereby draws reverse base current from transistor 64 to turn "off" transistor 64 with minimum delay. The voltage at collector electrodes 58 and 62 then rises toward +4 volts, and a voltage of +4 volts is supplied to all of the loads connected to the transmission lines 80 and 82**.

Other transmission lines may be connected to the collector electrodes 58 and 62 provided that the location and number of diode loads do not cause excessive reflections and that the power dissipations of the transistors are kept within desired limits. Connecting the collector supply resistors 84 and 86 and bias supply $+V_2$ volts at the outputs of the transmission lines results in a higher speed of operation than is obtainable when a collector supply resistor and bias source are connected directly between the collectors 58, 62 and the bias source. This is due to the fact that full current switching occurs in the transmission lines 80 and 82, for the condition illustrated, when transistors 42 and 64 switch. Essentially, full voltage swing occurs across the transmission lines 80, 82 when tranistors 42 and 64 switch, independent of the loading on the lines. If the collector load resistor were connected directly to the collector electrodes 58 and 62, the current carried by the transmission lines 80 and 82 would be largely determined by the conditions of the output gates and would be variable. Upon switching of the transistor 42 in the latter case, the voltage might build up in steps in the transmission lines by reflections.

The value of the common emitter resistor 30 is selected to provide fast turn-off of the output transistors 42 and 64, while at the same time assuring that the emitter followers do not overload and do not oscillate. The inductor 32 in series with the common emitter resistor 30 has the effect of presenting a high impedance to changes of current. When either of the common emitter transsistors **20*a* or 20*b* is switched, the resulting change in emitter 28*a* or 28*b* current initially is shunted to the base 40 of the output transistor 42 to provide faster switching thereof. Under certain conditions, however, the inductor 32 may have the effect of causing or tending to cause, either of the emitter follower circuits to oscillate, and the inductor 32** is not used in those cases, or in cases where sufficient switching speed is attained without it.

By way of illustration only, a circuit according to the invention operated successfully with the component values as follows:

| | |
|---|---|
| Resistors: | Ohms |
| **16** | 3.48K |
| **30** | 200 |
| **34** | 511 |
| **38** | 9.09K |
| **46** | 31.6 |
| **50** | 100 |
| **84** | 75 |
| **86** | 75 |
| Capacitor: | |
| **36** | 100 $\mu\mu$farads |
| Inductor: | |
| **48** | 0.22 $\mu$henries |
| Transistors: | |
| **20*a*, 20*b*, 64** | 2N744 or 2N834 |
| **42** | RCA TA-2118 |
| Diodes: | |
| All | S564G |
| Transmission line: | |
| **80, 82** | 75 ohms ($Z_0$) |
| Voltage sources: | Volts |
| $V_1$ | 15.5 |
| $V_2$ | 4 |
| $V_3$ | 5.5 |
| $V_4$ | 18.2 |

What is claimed is:

1. A logic circuit comprising:

a plurality of transistors of like conductivity type each connected in the common collector configuration and having a base electrode and an emitter electrode, a like plurality of diode gates, one for each of said transistors, each of said gates including a number of diodes having a first like electrode connected to the base electrode of the associated transistor, said diodes being connected to conduct forward current in the same direction relative to the associated said base electrode as the forward emitter-base diode current of the associated transistor, each of said gates further including a resistor connected at one end to each said first like electrode, means for applying a bias voltage at the other end of each said resistor of a polarity and amplitude tending to forward bias each of said gate diodes and each said emitter-base diode, a common emitter resistor connected between each said emitter electrode and a point of reference potential, first and second output transistors each having a collector electrode, an emitter electrode and a base electrode, means coupling the base electrode of the first output transistor to the said emitter electrode of each of said plurality of transistors, means connecting said emitter electrode of said first output transistor to said base electrode of the second output transistor, means connecting the collector electrodes of said first and second output transistors, means connecting said emitter electrode of said second output transistor to said point of reference potential, a transmission line having one end connected to the collector electrodes of said output transistors, a resistor and a source of collector bias potential serially connected between the other end of said transmission line and said point of reference potential, said resistor having a value to terminate said line in its characteristic impedance, and output load means connected to said transmission line between the ends thereof.

2. A logic circuit comprising:

a plurality of transistors of like conductivity type each connected in the common collector configuration and having a base electrode and an emitter electrode, a like plurality of diode gates, one for each of said transistors, each of said gates including a number of diodes having a first like electrode connected to the base electrode of the associated transistor, said diodes being connected to conduct forward current in the same direction relative to the associated said base electrode as the forward emitter-base diode current of the associated transistor, each of said gates further including a resistor connected at one end to each said first like electrode, means for applying a bias voltage at the other end of each said resistor having a polarity and amplitude tending to forward bias each of said gate diodes and each said emitter-base diode, a common emitter resistor connected between each said emitter electrode and a point of reference potential, an output transistor connected in the common emitter configuration and having a collector electrode and a base electrode, means coupling the base electrode of said output transistor to the said emitter electrode of each of said plurality of transistors, a transmission line having one end connected to the collector electrode of said output transistor, a resistor having one terminal connected at the other end of said transmission line, means for applying a bias voltage between the other end of said last-mentioned resistor and said point of reference potential, output load means connected to said transmission line between the ends thereof, and said last-mentioned resistor having a value to terminate said other end of said line in its characteristic impedance.

3. A logic circuit comprising:

a plurality of transistors of like conductivity type each connected in the common collector configuration and having a base electrode and an emitter electrode, a like plurality of diode gates, one for each of said transistors, each of said gates including a number of diodes having a first like electrode connected to the base electrode of the associated transistor, said diodes being connected to conduct forward current in the same direction, relative to the associated said base electrode, as the forward emitter-base diode current of the associated transistor, each of said gates further including a resistor connected at one end to each said like electrode, means for selectively applying to the other electrode of each of said gate diodes an input signal having either a first value or a second value, means for applying a bias voltage at the other end of each said resistor having an amplitude and polarity tending to forward bias each of said gate diodes and each said emitter-base diode, a common emitter resistor connected between each said emitter electrode and a point of reference potential, an output transistor of said like conductivity type connected in the common emitter configuration and having a collector electrode and a base electrode, means coupling the base electrode of said output transistor to the said emitter electrode of each of said plurality of transistors, a transmission line having one end connected to the collector electrode of said output transistor, a plurality of output loads tapped to said transmission line at different points along the length thereof, and a collector supply resistor for said output transistor, the latter resistor being connected at the other end of said line and having a value to terminate said line in its characteristic impedance.

4. A logic circuit comprising the combination of:

a plurality of diode logic gates;

a like plurality of transistors connected in the common collector configuration and each having a base electrode and an emitter electrode;

a common emitter resistor for said transistors connected to each said emitter electrode;

means connecting the output of each of said gates to a different said base electrode;

an output transistor connected in the common emitter configuration and having a collector electrode and a base electrode;

means connecting the base electrode of said output transistors to each said emitter electrode;

a transmission line having one end connected to the collector electrode of said output transistor;

a collector supply resistor for said output transistor connected at the other end of said transmission line and having a value to terminate said line in approximately its characteristic impedance; and a plurality of high impedance, variable output loads tapped to said line at different points along the length thereof.

5. The combination comprising:

a plurality of diode gates;

a like plurality of emitter followers connected in parallel and having a common output terminal, each of said emitter followers being connected to receive the output of a different one of said gates;

an output transistor connected in the common emitter configuration and having a base electrode and a collector electrode;

signal conveying means connecting said output terminal to said base electrode;

a transmission line having one end connected to the collector electrode of said output transistor;

a collector supply resistor and a source of bias potential connected in series between the other end of said line and the emitter of said output transistor, said collector supply resistor terminating said line in its characteristic impedancce; and at least one output load tapped to said transmission line between the ends thereof.

6. A logical circuit comprising the combination of:

a plurality of transistors connected in the common collector configuration and each having a base electrode and an emitter electrode;

input means for each said base electrode, respectively;

a common emitter resistor for said transistors connected to each said emitter electrode;

an output transistor connected in the common emitter configuration and having a collector electrode and a base electrode;

means connecting the base electrode of said output transistor to each said emitter electrode;

a transmission line having one end connected to the collector electrode of said output transistor;

a collector supply resistor for said output transistor connected at the other end of said transmission line and having a value to terminate said line in approximately its characteristic impedance; and a plurality of high impedance, variable output loads tapped to said line at different points along the length thereof.

References Cited by the Examiner

UNITED STATES PATENTS

| | | | |
|---|---|---|---|
| 1,382,914 | 6/21 | Hoxie | 330—68 |
| 2,310,198 | 2/43 | Maynard | 330—53 |
| 2,930,028 | 3/60 | Johnson et al. | 307—88.5 X |
| 2,995,667 | 8/61 | Clapper et al. | 307—88.5 |
| 3,039,009 | 6/62 | Gray | 307—88.5 |
| 3,058,007 | 10/62 | Lynch | 307—88.5 |
| 3,073,970 | 1/63 | Bright | 307—88.5 |

FOREIGN PATENTS

| | | |
|---|---|---|
| 605,821 | 9/60 | Canada. |

OTHER REFERENCES

Chow et al.: Transistor Circuit Engineering (text), 5/58, (page 153 relied on).

Giguere et al.: "Transistor Pulse Circuits for 160-Mc. Clock Rates," 1959 Solid-State Circuits Conference Digest of Technical Papers, (pages 68 to 70; page 70 relied on).

Marsocci, "Survey of Semiconductor Devices and Circuits in Computers," Semiconductor Products (mag.), January 1961, (pages 31 to 37) (page 31 relied on).

ARTHUR GAUSS, *Primary Examiner.*